Oct. 11, 1966  B. R. ANDERSON ETAL  3,278,881
MEMBRANE STRAIN GAUGE
Filed July 25, 1961

INVENTOR.
BURTON R. ANDERSON
BY John F. Cullen
ATTORNEY

United States Patent Office 3,278,881
Patented Oct. 11, 1966

3,278,881
MEMBRANE STRAIN GAUGE
Burton R. Anderson and Robert Frank French, both of Cincinnati, Ohio, assignors to General Electric Company, a corporation of New York
Filed July 25, 1961, Ser. No. 128,300
10 Claims. (Cl. 338—2)

The present invention relates to a membrane strain gauge and, more particularly, to such a strain gauge unit which separates the tensile and bending stresses when mounted on one side of the neutral axis of a stressed member to be measured.

In testing sheet metal structures under static load, the wall may be subjected to bending stresses of significant magnitude in comparison to the tensile, or so called membrane stresses. It is necessary to separate these stresses for purposes of design. A single strain gauge applied to the member to be stressed provides a combined reading in a standard fashion of these stresses. The usual method of separating the total wall stress in the structure into its individual membrane and bending component is to mount strain gauges back-to-back. From the readings thus obtained, two equations can be written with two unknowns and the strain components can be calculated. In many instances however, it is either undesirable, difficult resulting in high cost, or impossible to mount gauges on both sides of a wall. For example, in a closed cylinder which may be sealed, it is impossible to place a strain gauge on the inner surface of the wall member. Also, the member being tested, such as a cylinder, may be subjected to extremely high hydrostatic pressures which would damage the inside gauge. Other applications may encounter heat on the inner surface which would damage the gauge. Where a strain gauge cannot be used on the inner surface it is therefore not possible to separate the wall stresses into the individual components and therefore desirable test data or information may be lacking.

The main object of the present invention is to provide a membrane strain gauge unit for attachment on one side of the surface of a stressed member to be measured (regardless of the neutral axis location) which unit provides individual or separate readings of the tensile and bending strains.

Another object is to provide such a unit which is made of conventional strain gauges so arranged in a package as to make the previous object possible.

A further object is to provide such a unit which is also applicable for use with strain gauge rosettes.

Briefly stated, the membrane strain gauge unit for attachment to one side of the surface of a stressed member (regardless of the neutral axis location) disclosed herein comprises a first strain gauge cemented to a flexible plastic member of predetermined dimensions and known strain distribution and a second strain gauge bonded to the opposite surface of the plastic member and oriented in alignment with the first strain gauge. Two readings can be taken from the two gauges and the two unknowns, tensile and bending strains, can be calculated from the single unit which is mounted to only one wall of the stressed member to be measured and on one side of the neutral axis.

While the specification concludes with claims particularly pointing out and distinctly claiming the subject matter which we regard as our invention, it is believed the invention will be better understood from the following description taken in connection with the accompanying drawing in which:

Figure 1:
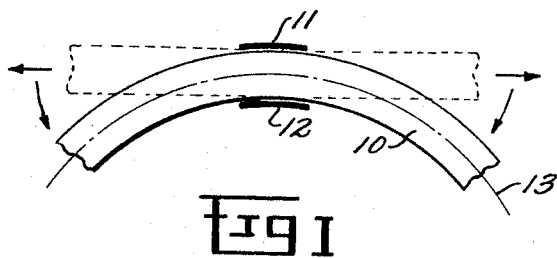
FIGURE 1 is a diagrammatic view illustrating the conventional back-to-back arrangement of a pair of strain gauges usually necessary.

Referring first to FIGURE 1, the conventional structure for taking readings to separate the tensile and bending stresses in the members is illustrated. For purposes of the invention, it is assumed that standard equipment will be connected to each conventional strain gauge, such as a potentiometer, and the gauges are read by such units by attachment of the usual leads to the indivdual strain gauges. Further, the strain gauges are cemented or bonded to the member as is normal.

In the usual manner of measurement, member 10 may be subjected to tensile and bending stresses by the application of loads as indicated by the arrows in FIGURE 1. Strain gauges 11 and 12 are bonded to the surface of member 10 on opposite sides of neutral axis 13 and read in the conventional manner. Each gauge 11 and 12 will read the combined tensile and bending strain and the two gauges are necessary in order to separate these two strains. For example, the top gauge 11 will measure a combined strain epsilon $t$ which is composed of the membrane strain epsilon $m$ plus the tensile bending strain epsilon $b$ and since the strains the top gauge senses are both tensile they will add to each other. The bottom gauge 12 will measure the total strain epsilon $t$ which includes the same membrane strain epsilon $m$ plus a compressive bending strain epsilon $b$ which is opposite to and cancels the top gauge tensile bending strain. Expressed as equations these total strains are:

Gauge 11:  $E_t = E_m + E_b$
Gauge 12:  $E_t = E_m - E_b$

It can be seen that the bending strains are due to tension and compression and will cancel so the two equations can be solved for the two unknowns which are the bending strain and the tensile strain. This is standard procedure and well known.

Figure 2:
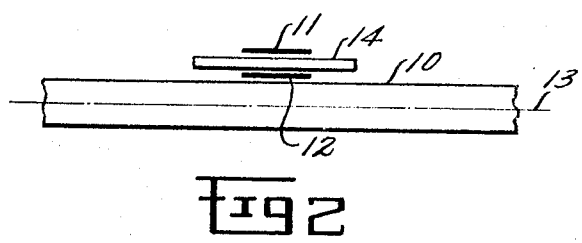
FIGURE 2 is a diagrammatic view of the unit of the instant invention applied to a member to be stressed.

Referring next to FIGURE 2, the strain gauge unit of the instant invention is shown comprising a first or top strain gauge 11 and a second or bottom strain gauge 12 which are bonded by conventional means to opposite surfaces of an intermediate plastic or sandwich member 14. It is to be noted that the unit comprising the strain gauges 11 and 12 and plastic member 14 is attached to the member 10 to be stressed on one side of the center line (which is the neutral axis) 13. Thus, on a rectangular cross section member as shown, the unit is on one side of the neutral axis. The same results will be obtained as those previously described however, these results will be obtained by the instant unit on one side only of member 10.

The plastic member 14 is a flexible member of predetermined dimensions and known strain distribution. The plastic must be flexible or elastic enough to transmit the strain through it yet not inflexible enough to stiffen the structure or member which is being stressed. Preferably it is desirable to use plastic which linearly transmits the strain (see FIGURE 3). While any suitable flexible plastic member having a known strain distribution is satisfactory since any error may then be allowed for, it is preferable to select a plastic having as close to linear transmission of strain as possible. The epoxy resins are suitable plastics having this characteristic. However, while preferred, they are not essential as long as the strain distribution of the plastic is known. Furthermore, as will be pointed out later, the dimensions of the plastic member must be known and can be selected to provide extremely accurate results.

Figure 3:
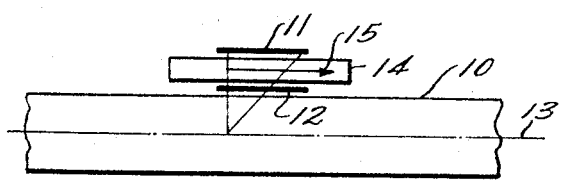
FIGURE 3 is a similar view showing the stress characteristics across the plastic member.

The whole strain gauge unit 11, 12 and 14 as well as being individually cemented together is additionally cemented or bonded, preferably by epoxy cement, to member 10 as shown in FIGURES 2 and 3. In FIGURE 3 it can be seen that the gauges 11 and 12 will stretch the same amount due to tension loads whereas the strain due to bending will be different depending on the distance from the center line 13 as seen by the force diagram on FIGURE 3. At the neutral axis the bending stress is zero and, by linear distribution through the plastic it can be seen that the bending stress in gauge 11 is represented by the arrow 15. It will also be apparent that if the strain distribution across the plastic member is not linear but is known, the magnitude of arrow 15 will be known. Thus, the top gauge 11 sees a bending strain which is an extension of the bending strain that the bottom gauge 12 sees in a magnitude dependent on the strain distribution across the plastic member 14 as shown in FIGURE 3. This can be accounted for by calibration or suitable correction in the readings. It is important that the individual strain gauge grids comprising the individual strands of the gauge are substantially axially aligned with one another for extremely accurate readings. In other words, gauges 11 and 12 are axially aligned on opposite surfaces of plastic member 14.

It may be necessary, in the read-out instruments, to use a lower voltage because of the heat sink limitations associated with the plastic. Thus, gauge 12 may develop heat to heat up the plastic to cause thermal expansion and it may be desirable to keep the heat down by using lower voltage or to make the appropriate corrections. However, this is not a limitation on the unique unit disclosed herein.

Figure 4:
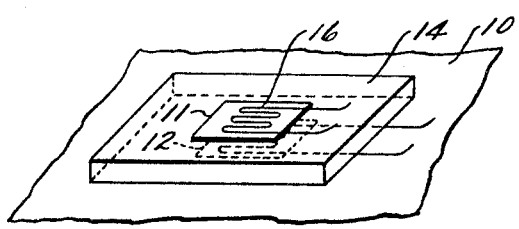
FIGURE 4 is a partial perspective view illustrating the strain gauge unit as applied to a member to be stressed; and, FIGURE 5 is a plan view illustrating two types of rosettes that may be used with the instant invention.

Referring next to FIGURE 4, there is shown the strain gauge unit of the instant invention in perspective as applied to a member 10. As can be seen, the individual gauges comprising grids 16 are mounted on opposite surfaces of plastic member 14 and the whole unit is then cemented to member 10.

Preferably the thinner the plastic member 14 is made in relation to the member 10 to be stressed the more efficiently the gauge operates simply because the strain distribution through the plastic member is more accurately transmitted and bonding problems are easier. For this reason, it has been found preferable, for extremely accurate readings, to have the plastic member substantially one half the thickness of the member to be measured at the point of attachment of the unit to the stressed member 10. Similarly, it is desirable to keep the gauge or grid element of the individual strain gauge a finite distance from the periphery of the plastic member because the strain transmission through the plastic member is not perfect at the edges. For this purpose, it has been found that the length to thickness and width to thickness ratio of the plastic member should be at least 5 to 1 and the edge of he gauge should be at least one-eighth inch from the edge of the plastic member. Thus, the gauge is mounted on the plastic member within these limitations as shown in FIGURE 4.

Figure 5:
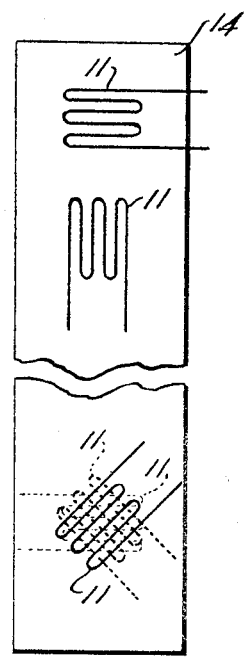

Referring next to FIGURE 5, the application of the instant invention to a strain gauge rosette is illustrated. The top port of FIGURE 5 illustrates strain gauges 11 oriented at 90 degrees to one another and it will be understood that similar aligned gauges are located on the opposite surface of flexible member 14. The lower part of FIGURE 5 illustrates three strain gauges 11 oriented upon one another at different angles and again, the duplicate pattern occurs on the opposite surface of plastic member 14. The rosette, of course, merely provides more readings of stresses in different directions as such knowledge may be required. Each individual strain gauge of the rosettes is reproduced in substantial alignment with a corresponding strain gauge on the opposite surface of plastic member 14.

Thus, the invented strain gauge unit is a unit for attachment to one side only of a stressed member on one side of its surface for reading more than one strain without the necessity of providing individual gauges on each side of the member.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

We claim:

1. A membrane strain gauge unit for attachment on one side of the neutral axis of a stressed member to be measured, said unit comprising, a first strain gauge, a flexible plastic member of predetermined dimensions and known strain distribution, said first gauge being bonded to a surface thereof, and a second strain gauge axially aligned with said first gauge and bonded to the opposite surface of said plastic member.

2. Apparatus as described in claim 1 wherein the plastic member is an epoxy resin.

3. A membrane strain gauge unit for attachment on one side of the surface of a stressed member to be measured, said unit comprising, a first strain gauge having strands forming a grid, a flexible plastic member of predetermined dimensions and known strain distribution, said first gauge being bonded to a surface thereof, and a second strain gauge having strands forming a grid substantially axially aligned with the strands of said first gauge and bonded to the opposite surface of said plastic member.

4. Apparatus as described in claim 3 wherein the plastic member is an epoxy resin.

5. Apparatus as described in claim 3 wherein the thickness of said plastic member is substantially one half the thickness of the stressed member to be measured at the location of attachment of the unit to the stressed member.

6. Apparatus as described in claim 3 wherein the length to thickness ratio and width to thickness ratio of said plastic member is at least five to one.

7. Apparatus as described in claim 3 wherein the strain gauges are disposed at least ⅛" from the edges of said plastic member.

8. A membrane strain gauge unit for attachment on one side of the surface of a stressed member to be measured, said unit comprising, a first strain gauge rosette, a flexible plastic member of predetermined dimensions and known strain distribution, said rosette being bonded to one surface of said plastic, and a second strain gauge rosette bonded to the opposite surface of said plastic, each gauge of one of the rosettes being substantially aligned with a corresponding gauge in the opposite surface rosette.

9. Apparatus as described in claim 8 wherein said plastic member is an epoxy resin of substantially one half the thickness of the stressed member to be measured at the location of attachment of the unit to the stressed member.

10. A bending strain transducer for the investigation of strain gradients imposed upon a workpiece, comprising first and second similar bonded resistance strain gauges each having a predetermined gauge length, said gauges being electrically insulated from each other, a flexible elongated base separator strip having a predetermined base length substantially greater than said gauge length, said separator strip having a known strain distribution when flexed, said gauges being bonded symmetrically upon opposite surfaces of said base strip and means substantially coextensive with one of said surfaces bonding said gauges and said strip to one surface of the workpiece.

(References on following page)

References Cited by the Examiner

UNITED STATES PATENTS

| | | | |
|---|---|---|---|
| 2,318,102 | 5/1943 | Ruge | 338—2 |
| 2,429,087 | 10/1947 | Aughtie et al. | 338—2 |
| 2,599,578 | 6/1952 | Obert et al. | 338—2 |
| 2,920,298 | 1/1960 | Hines | 73—88.5 X |
| 3,005,170 | 10/1961 | Starr | 338—2 |

OTHER REFERENCES

Perry and Lissner's "The Strain Gage Primer," pp. 246–248, 1955.

RICHARD M. WOOD, *Primary Examiner.*

RAY K. WINDHAM, *Examiner.*

H. T. POWELL, W. D. BROOKS, *Assistant Examiners.*